(12) United States Patent
McMillen et al.

(10) Patent No.: US 8,157,321 B2
(45) Date of Patent: Apr. 17, 2012

(54) CUSHION PRESENTER SYSTEM

(75) Inventors: Robert J. McMillen, Tecumseh (CA); Renato Colja, Windsor (CA); Larry D. Janzen, Windsor (CA); Niels S. Mossbeck, Carthage, MO (US); Alan Prettyman, Amherstburg (CA)

(73) Assignee: Schukra of North America Co., Tecumseh, Ontario (CA)

( * ) Notice: Subject to any disclaimer, the term of this patent is extended or adjusted under 35 U.S.C. 154(b) by 334 days.

(21) Appl. No.: 12/080,360

(22) Filed: Apr. 2, 2008

(65) Prior Publication Data
US 2008/0238164 A1   Oct. 2, 2008

Related U.S. Application Data

(60) Provisional application No. 60/909,668, filed on Apr. 2, 2007.

(51) Int. Cl.
*B62J 1/00*   (2006.01)
(52) U.S. Cl. .............. 297/195.12; 297/200; 297/215.11; 297/284.9
(58) Field of Classification Search ............ 297/195.12, 297/200, 215.11, 284.9
See application file for complete search history.

(56) References Cited

U.S. PATENT DOCUMENTS

| | | | | |
|---|---|---|---|---|
| 556,448 | A | * | 3/1896 | Van Meter ............... 297/200 |
| 574,503 | A | * | 1/1897 | Van Meter ............... 297/200 |
| 2,558,389 | A | * | 6/1951 | Robinson ................ 297/200 |
| 3,867,732 | A | * | 2/1975 | Morrell ................ 297/284.3 |
| 4,124,248 | A | * | 11/1978 | Mayer ................... 297/204 |
| 4,589,695 | A | * | 5/1986 | Isono .................. 297/284.9 |
| 4,673,212 | A | * | 6/1987 | Mayer ................ 297/215.13 |
| 4,804,221 | A | * | 2/1989 | Saiki .................. 297/284.9 |
| 4,840,425 | A | * | 6/1989 | Noble ................. 297/284.1 |
| 4,965,899 | A | * | 10/1990 | Sekido et al. .......... 297/284.6 |
| 5,280,997 | A | * | 1/1994 | Andres et al. ......... 297/284.9 |
| 5,419,612 | A | * | 5/1995 | Rassekhi ............... 297/200 |
| 5,658,050 | A | * | 8/1997 | Lorbiecki ............ 297/452.41 |
| 6,623,080 | B2 | * | 9/2003 | Clapper .............. 297/452.41 |
| 7,455,355 | B1 | * | 11/2008 | Kohlman .............. 297/200 |
| 2005/0121953 | A1 | * | 6/2005 | Sprouse ............... 297/199 |
| 2007/0057551 | A1 | * | 3/2007 | Lachenmann et al. ..... 297/284.9 |

* cited by examiner

*Primary Examiner* — Peter R. Brown
(74) *Attorney, Agent, or Firm* — Michael Best & Friedrich LLP

(57) ABSTRACT

A variety of cushion presenters may be provided in seats such as motorcycle. These cushion presenters are filled with air to envelop and support the hips of a rider. The cushion presenters may further be used to provide sacrum, support. Additional cushion presenters may be used in the buttock region to relieve tail burn. A linkage may further be provided to provide a actuated backrest.

10 Claims, 7 Drawing Sheets

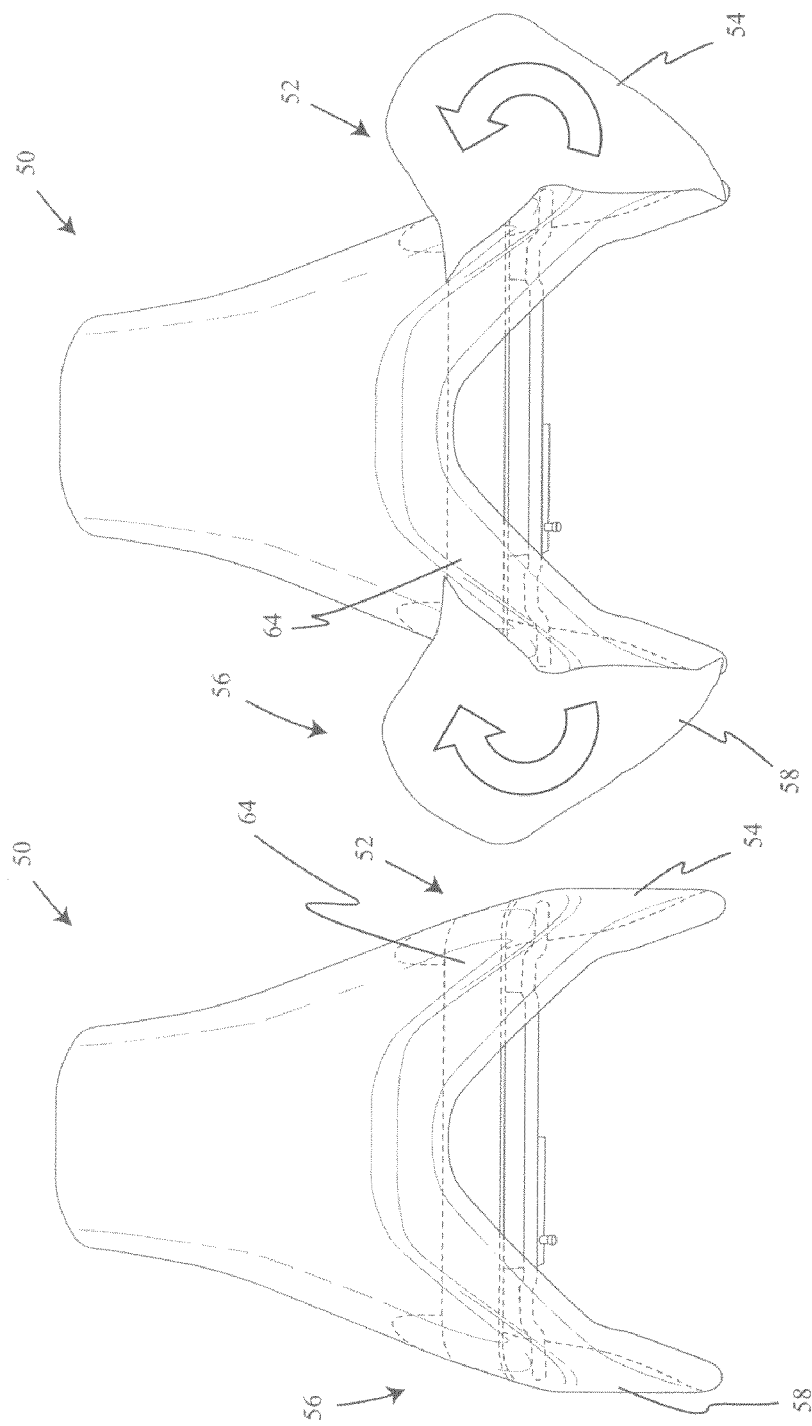

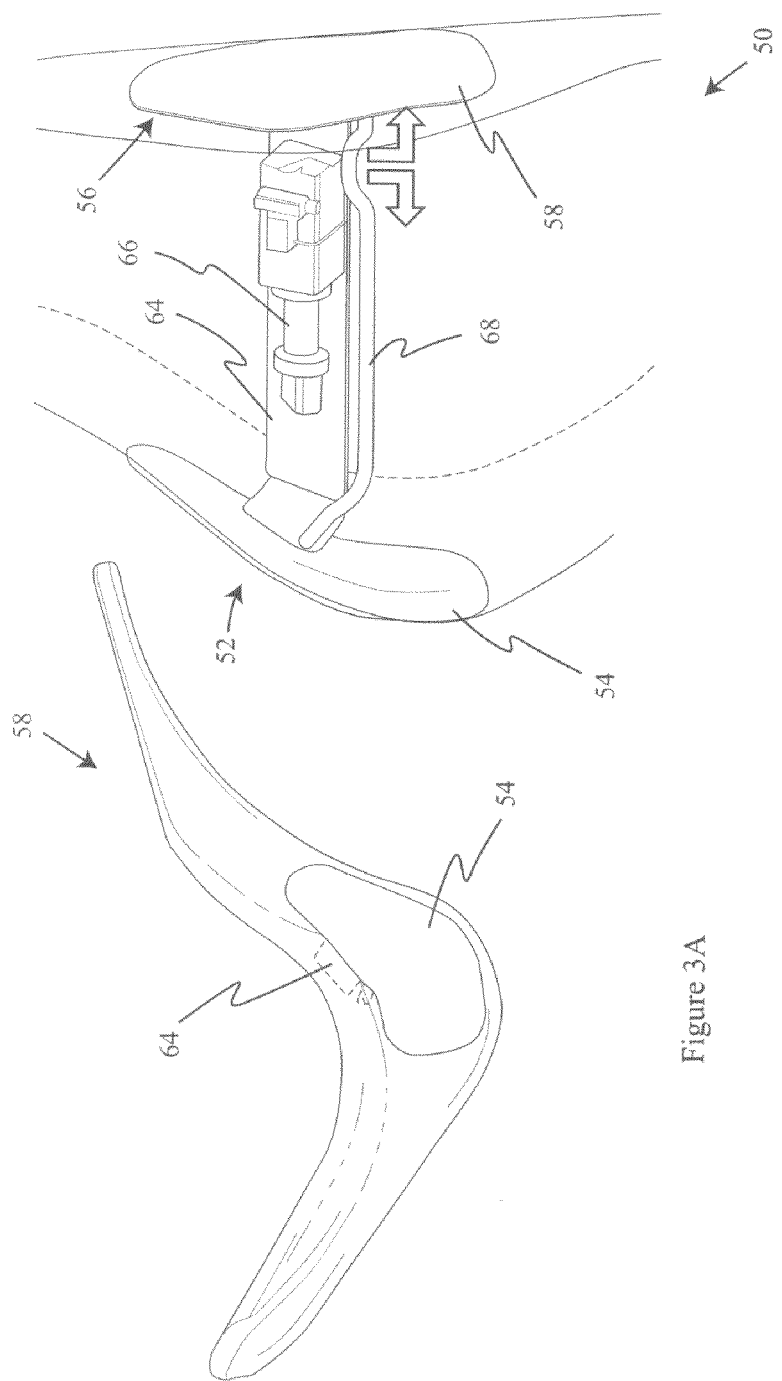

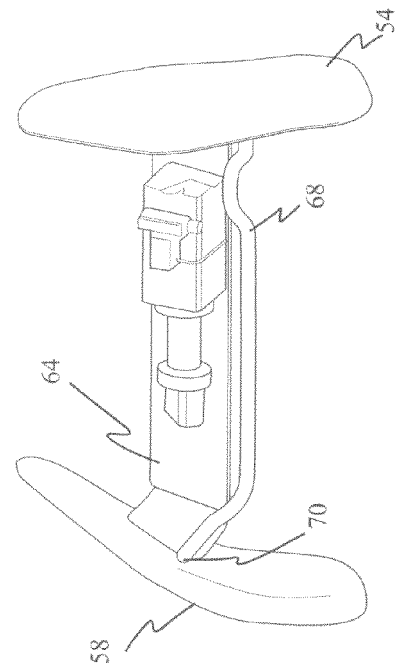
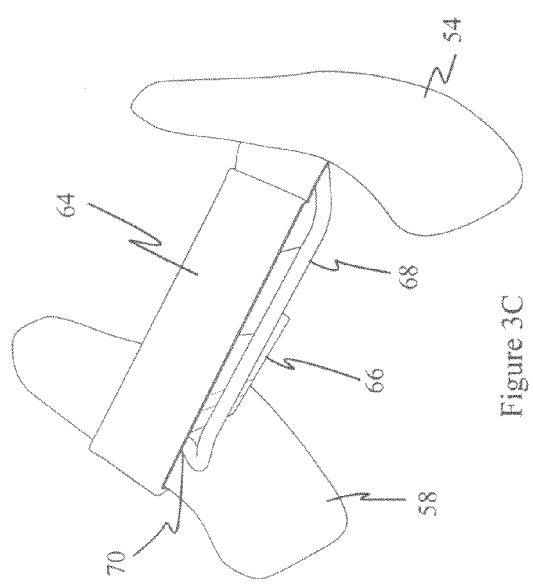
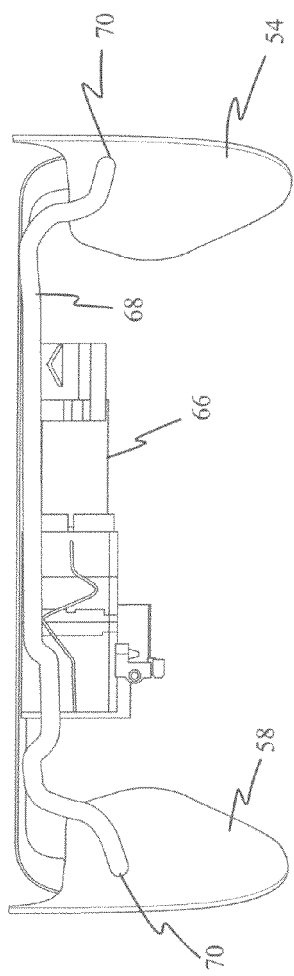

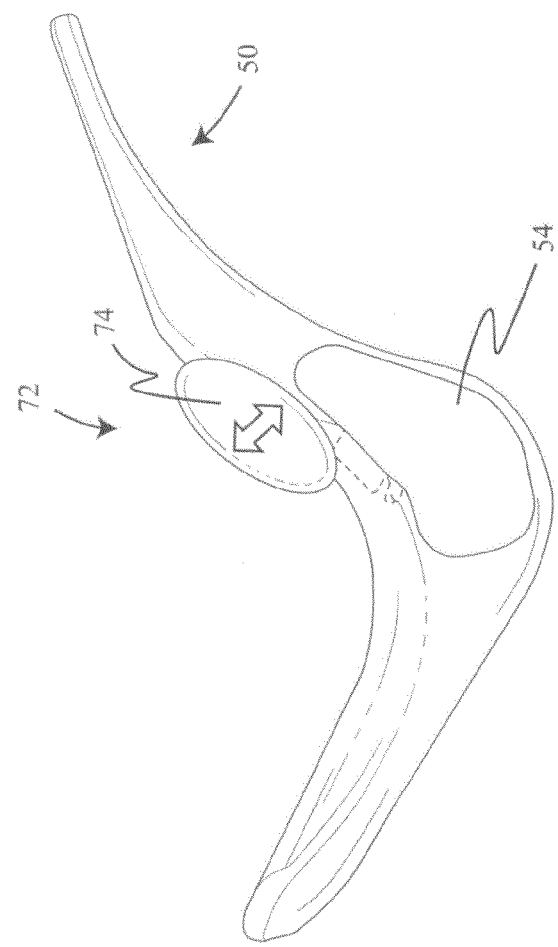
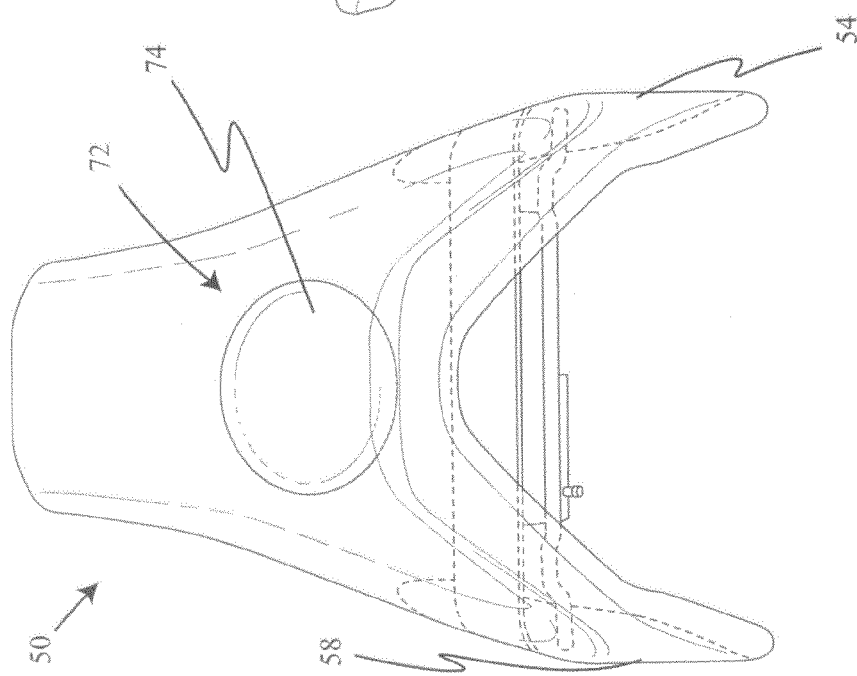
Figure 5
Figure 4

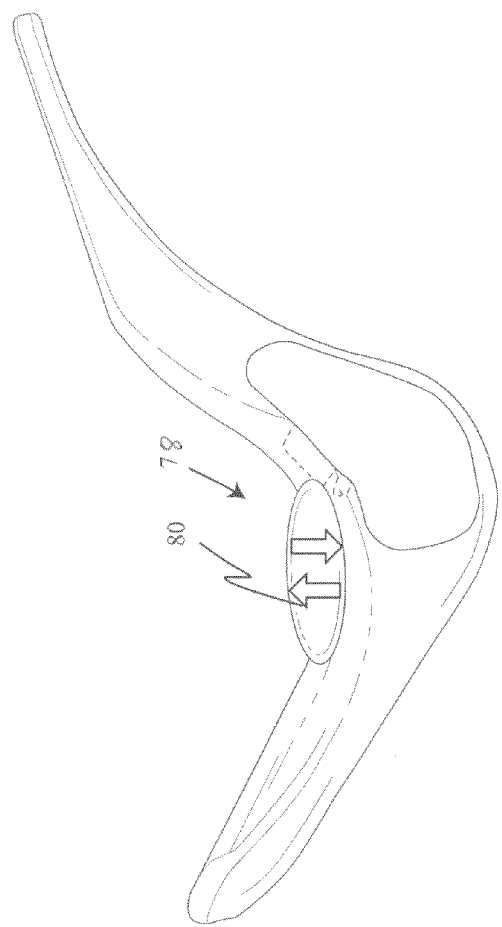
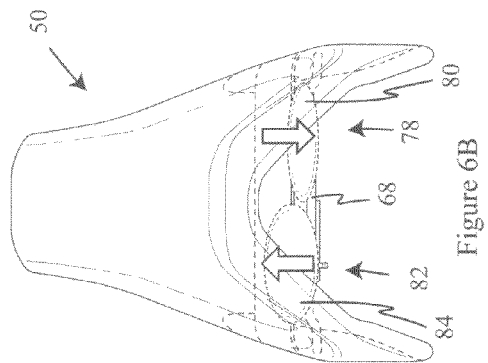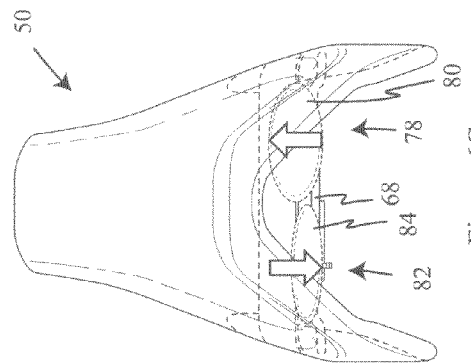

CUSHION PRESENTER SYSTEM

STATEMENT REGARDING FEDERALLY SPONSORED RESEARCH

Not Applicable.

APPENDIX

Not Applicable.

BACKGROUND OF THE INVENTION

1. Field of the Invention

The present invention relates to cushioning and, more particularly, to a cushion presenter system.

2. Related Art

Typical seats for motorcycles, all terrain vehicles, snowmobiles, tractors, boats, riding lawn mowers and other similar vehicles are designed for basic functions and appearance. Third party aftermarket suppliers provide aftermarket seats that add extra padding support in a fixed position profile.

These aftermarket seats can require a custom fit for each driver, have the added expense of installing a custom seat as an aftermarket accessory, and can be associated with a change in profile that can change the appearance of the vehicle. Presently, custom seating does not fit multiple drivers that have different statures.

SUMMARY OF THE INVENTION

The invention is a seat cushion expansion system that expands cushion profiles.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a front view of the seat of the present invention;

FIG. 2A is a front view of the seat of FIG. 1, with the cushion in an expanded position;

FIG. 3A is a side view of the seat of FIG. 1 of the present invention;

FIG. 3B is a bottom elevated view of the seat of FIG. 1 of the present invention;

FIG. 3C is a front elevated view of the cushion presenter assembly of the present invention;

FIG. 3D is a front view of the cushion presenter assembly of the present invention;

FIG. 3E is a bottom elevated view of the cushion presenter assembly of the present invention;

FIG. 4 is a front view of a first alternative embodiment of the present invention providing a sacrum support expansion zone;

FIG. 5 is a side view of the first alternative embodiment shown in FIG. 4;

FIG. 6A is a side view of a second alternative embodiment of the present invention providing dual sacrum support expansion zones;

FIG. 6B is a front view of the second alternative embodiment of the present invention, with the dual sacrum support expansion zones in a first position;

FIG. 6C is a front view of the second alternative embodiment of the present invention, with the dual sacrum support expansion zones in a second position;

DETAILED DESCRIPTION OF THE PREFERRED EMBODIMENTS

Figure 2B:
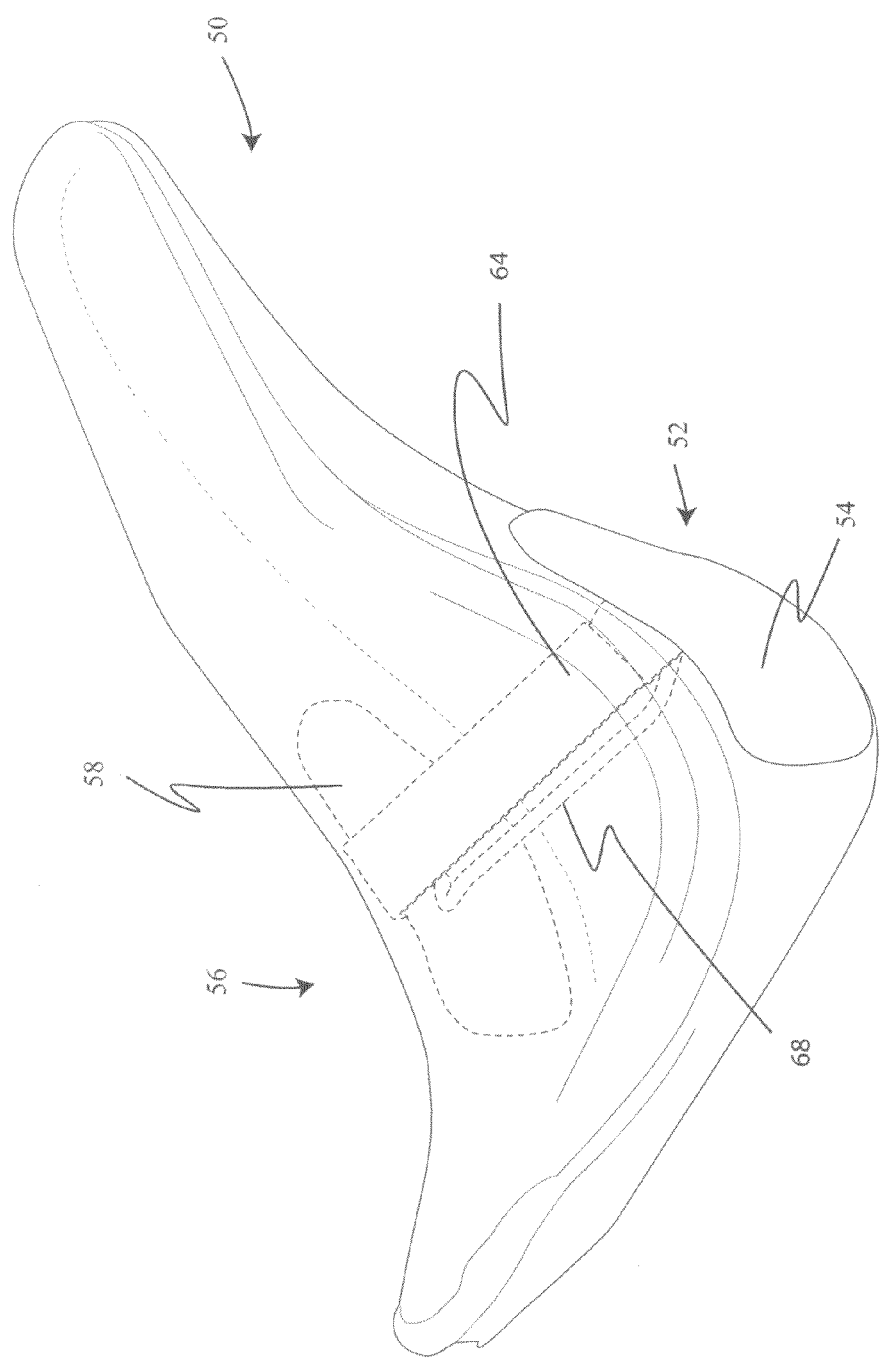
FIG. 2B is an elevated side view illustrating the seat of FIG. 1.

The following description of the preferred embodiment(s) is merely exemplary in nature and is in no way intended to limit the invention, its application, or uses.

FIGS. 1-3E illustrate an embodiment of the present invention wherein a motorcycle seat, shown generally at 50, is provided with a first side expansion zone, shown generally at 52, and a second side expansion zone, shown generally at 56. First side expansion zone 52 comprises a first cushion bolster 54. Similarly, second side expansion zone 56 comprises a second cushion bolster 58. First and second cushion bolsters 54, 58, are connected by supporting strap 64 which is best seen in FIGS. 3C, 3D, and 3E. The first and second side expansion zones 52, 56 provide an occupant with lateral support. Each expansion zone 52, 56 may be expanded or presented (to a seat occupant). First and second cushion bolsters 54, 58 are air bladders.

Air is introduced to the air bladders 54, 58, via an air pump 66, and air hose 68 connected between air pump 66 and first and second cushion bolsters 54, 58. As air fills air bladders 54, 58, they expand and provide lateral support to a seat occupant. It should be appreciated that air pump 66 does not have to be disposed on supporting strap 64, but can be disposed at a distance so long as air hose 68 connects air pump 66 to first and second cushion bolsters 54, 58.

In operation, the user may turn the air pump on (preferably a two-way switch), the first and second cushion bolsters 54, 58, expand and provide greater lateral support. As best seen in FIG. 2A, the first and second expansion zones, 52, 56, are relatively large, with each expanding several inches. Also, the first and second cushion bolsters 54, 58 expand in a way that essentially rotates each bolster 54, 58 around the buttocks of the seat occupant and up towards the hips of a seat occupant to provide a saddle-like contour to engage the outside of the hips of the seat occupant. It is important that the air hose 68 is connected to air pump 66 at a point which is intermediate the ends of the air hose 68. When the motorcycle is turned off, the air pump 66 will automatically remain on and pump air out of the bolsters 54, 58, to maintain a streamlined look.

FIGS. 4 and 5 introduce a further alternative embodiment of the present invention. Specifically, disposed on motorcycle seat 50 there is a sacrum support expansion zone, shown generally at 72, comprising a sacrum support bladder 74. The purpose of the sacrum support bladder 74 is to expand, prevent pelvic roll forward, and minimize the discomfort in the lumbar region. The sacrum support bladder 74 is preferably supplied with air from air hose 68 and air pump 66. However, a separate air hose (not shown) and/or air pump (not shown) may be provided if desired. In this alternative embodiment, when the motorcycle is turned off, the air pump 66 will automatically remain on and pump air out of sacrum support bladder 74.

FIGS. 6A, 6B, and 6C introduce a further alternative embodiment of the present invention. Specifically, disposed on motorcycle seat 50, there is provided a first buttock expansion zone, shown generally at 78, and a second buttock expansion zone, shown generally at 82. First buttock expansion zone 78 comprises a first bladder 80. Second buttock expansion zone 82 comprises second bladder 84. First bladder 80 and second bladder 84 are each connected to air pump 66 via air hose 68. The first and second buttock expansion zones 78 and 82 work together to provide a passive offset motion for massage. This minimizes what is commonly referred to as tail burn (discomfort in the buttock area) which is experienced by motorcycle riders who have been sitting for long periods of time.

In operation, FIG. 6B shows a first position in which first bladder 80 is either empty or relatively deflated, and in which second bladder 84 is full or relatively inflated. Then, in FIG. 6C, first bladder 80 is inflated further and second bladder 84 is deflated. Thus, the bladders 80 and 84 oppositely and cyclically inflate and deflate. This imparts a passive massage to the buttock region of the seat occupant and relieves the discomfort associated with tail burn. This cyclical passive massage can be activated by a switch, which actuates air pump 66 to either pump or draw air from each bladder 80, 84.

Figure 7:
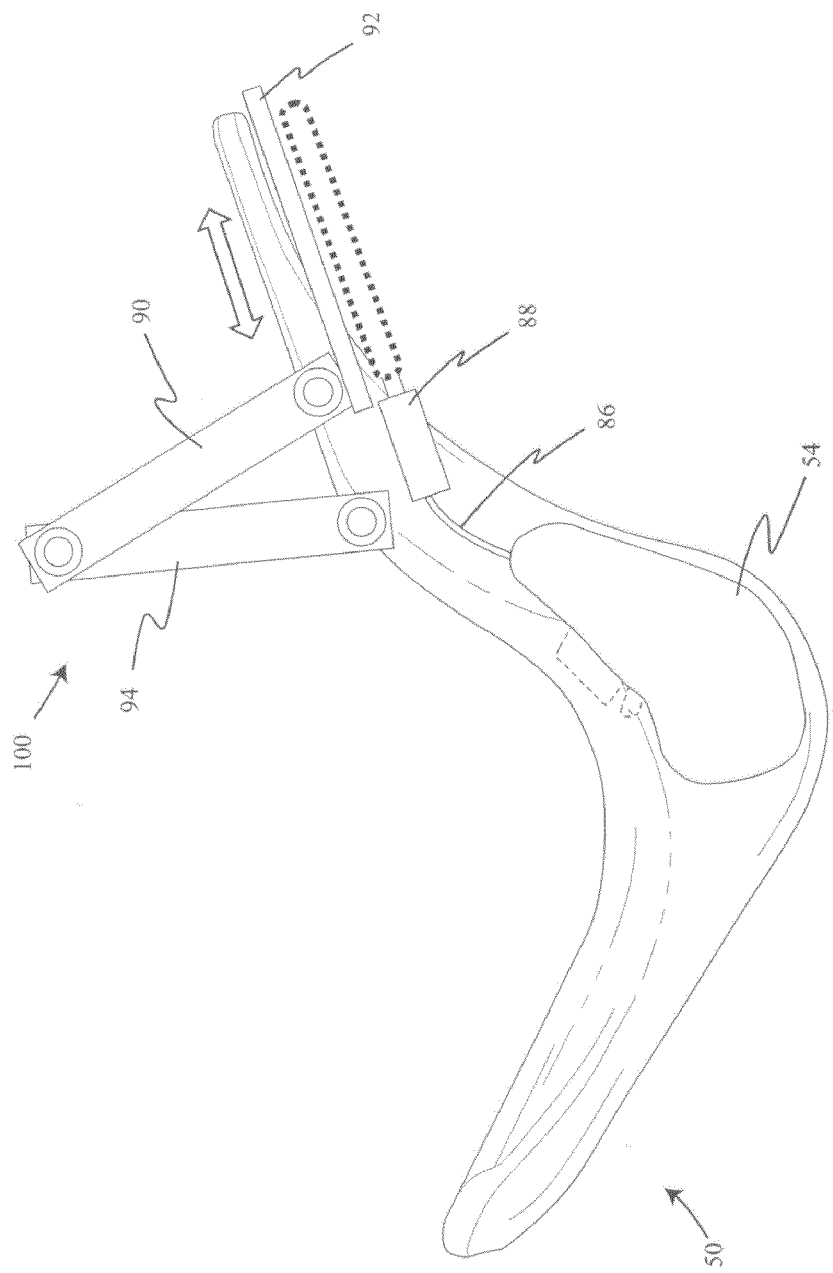
FIG. 7 is a side view of a third alternative embodiment of the present invention that provides a further actuating backrest.

FIG. 7 illustrates a third alternative embodiment of the present invention. In this third embodiment, an actuating backrest, shown generally at 100, is provided for additional comfort. An air tube 86, connected at one end to air pump 66, is connected to air cylinder 88. Air cylinder 88 is connected to a slide pivot mechanism. Specifically, air cylinder 88 is connected to one end of first slide pivot 90. The other end of first slide pivot 90 is connected to second link pivoting member 94. As air cylinder 88 extends or retracts, first slide pivot 90 slides along seat track rails 92, and a pivoting motion is observed between first slide pivot 90 and second link pivoting member 94. Accordingly, second link pivoting member 94 may be raised or lowered relative to the motorcycle seat 50 to provide more or less back support to the rider. It will be appreciated that the covering of the seat around first slide pivot 90 and second link pivoting member 94 has been removed from view for clarity.

When the bike is turned off, the air may alternatively be released instead of pumped out by air pump 66.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A bolster system which is mounted to a motorcycle seat for providing lateral support to a seat occupant, the motorcycle seat including an upper supporting surface and first and second opposed side surfaces extending downwardly therefrom, the bolster system comprising:
    an air pump;
    a first side expansion zone positioned along the first side surface of the motorcycle seat;
    a second side expansion zone positioned along the second side surface of the motorcycle seat opposite the first side expansion zone;
    a first cushion air bladder for moving the first side expansion zone, the first cushion air bladder expandable from a non-expanded state to an expanded state; and
    a second cushion air bladder for moving the second side expansion zone, the second cushion air bladder expandable from a non-expanded state to an expanded state,
    wherein said first and second cushion air bladders are each connected to said air pump,
    wherein said air pump is operable to expand said first and second air cushion bladders from the non-expanded state to the expanded state,
    wherein expansion of said first and second air cushion bladders moves the first and second side expansion zones outwardly and upwardly away from the first and second side surfaces of the motorcycle seat to a location above the upper supporting surface of the motorcycle seat, and
    wherein the expansion zones are adapted to expand upwardly and around the buttocks of the seat occupant.

2. A bolster system for a motorcycle seat according to claim 1, further comprising:
    a supporting strap extending laterally across the upper supporting surface of the motorcycle seat and connected between said first cushion bladder and said second cushion bladder.

3. A bolster system for a motorcycle seat according to claim 2, wherein when the first and second cushion air bladders are in the non-expanded state, the first and second side expansion zones are below the supporting strap, and wherein when the first and second cushion air bladders are in the expanded state, the first and second side expansion zones extend above the supporting strap.

4. A bolster system for a motorcycle seat according to claim 2, wherein the air pump is disposed on the supporting strap.

5. A bolster system for a motorcycle seat according to claim 1, further comprising:
    a sacrum support bladder disposed on said seat and connected to said pump.

6. A bolster system for a motorcycle seat according to claim 1, further comprising:
    a third air bladder;
    a fourth air bladder;
    wherein said third and fourth air bladders are disposed between said first and second cushion air bladders.

7. A bolster system for a motorcycle seat according to claim 6, where said third and fourth air bladders are adapted to be alternately inflated to provide a massaging action to the motorcycle seat occupant.

8. A bolster system for a motorcycle seat according to claim 1 further comprising:
    a backrest disposed on said seat, said backrest having an air cylinder, a first slide pivot connected to said air cylinder, a seat track rail connected to said first slide pivot, and a second link pivoting member connected to said first slide pivot, wherein actuation of said air cylinder causes first slide pivot to slide, thereby raising and lowering said second link pivoting member to raise and lower said backrest.

9. A bolster system for a motorcycle seat according to claim 1, wherein when the first and second cushion air bladders are in the non-expanded state, the first and second side expansion zones are below the upper supporting surface of the motorcycle seat, and wherein when the first and second cushion air bladders are in the expanded state, the first and second side expansion zones are rotated upwardly to positions above the upper supporting surface of the motorcycle seat.

10. A bolster system for a motorcycle seat according to claim 1, wherein the motorcycle seat includes a side profile, and wherein when the first and second cushion air bladders are in the non-expanded state, the first and second side expansion zones are substantially flush with the side profile.

* * * * *